May 7, 1968  H. H. HOLL  3,381,546
POWER TRANSMITTING MECHANISM
Filed Jan. 21, 1966  4 Sheets-Sheet 2
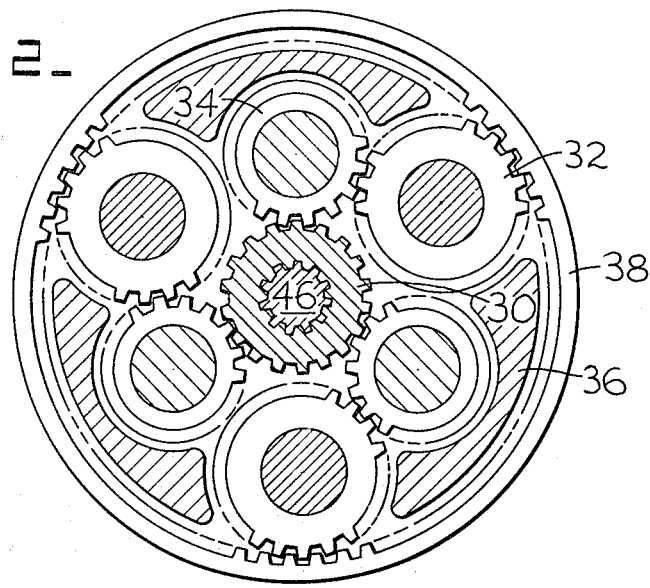
Fig-2-
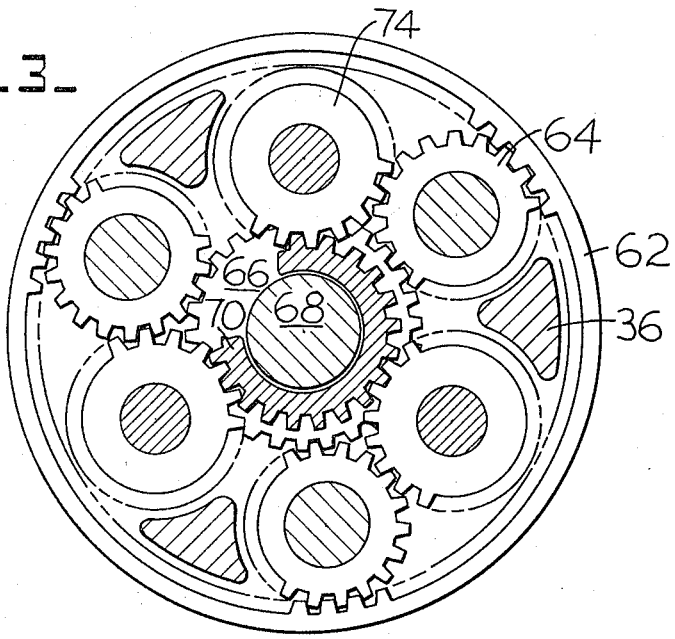
Fig-3-
INVENTOR.
HAROLD H. HOLL
BY Frazer, Gensvold, Fix & Phillips
ATTORNEYS May 7, 1968 H. H. HOLL 3,381,546
POWER TRANSMITTING MECHANISM
Filed Jan. 21, 1966 4 Sheets-Sheet 3
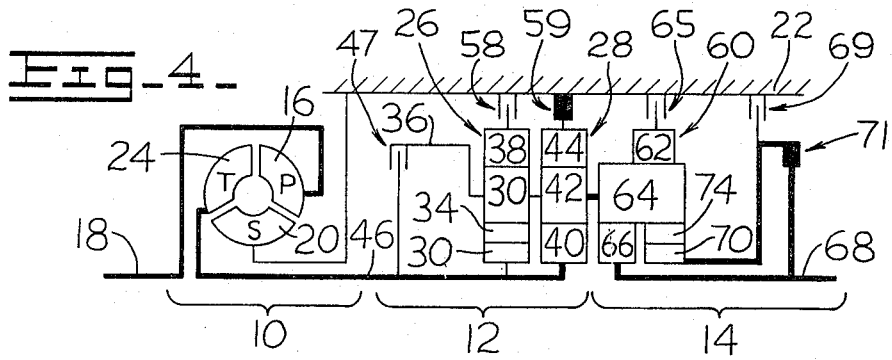
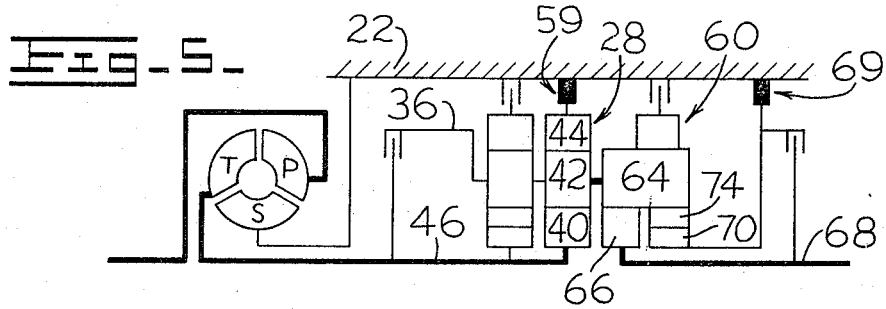
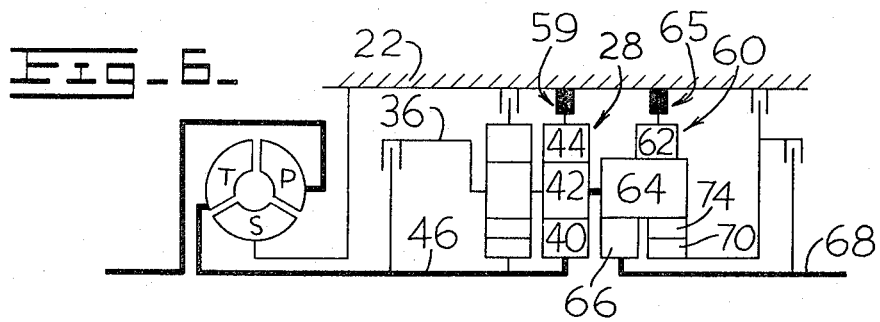
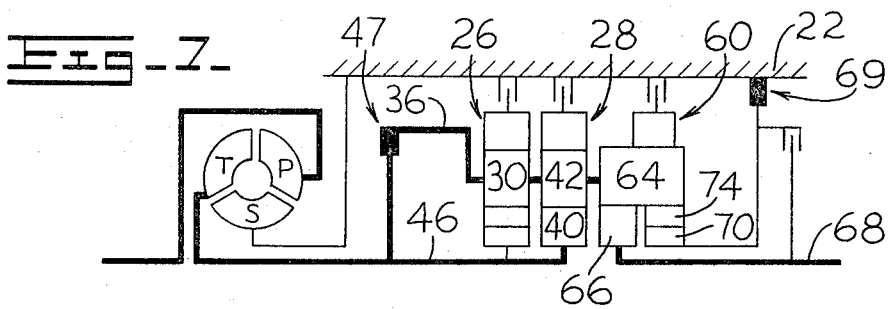
INVENTOR.
HAROLD H. HOLL
BY Fryer, Tjensvold, Feix & Phillips
ATTORNEYS

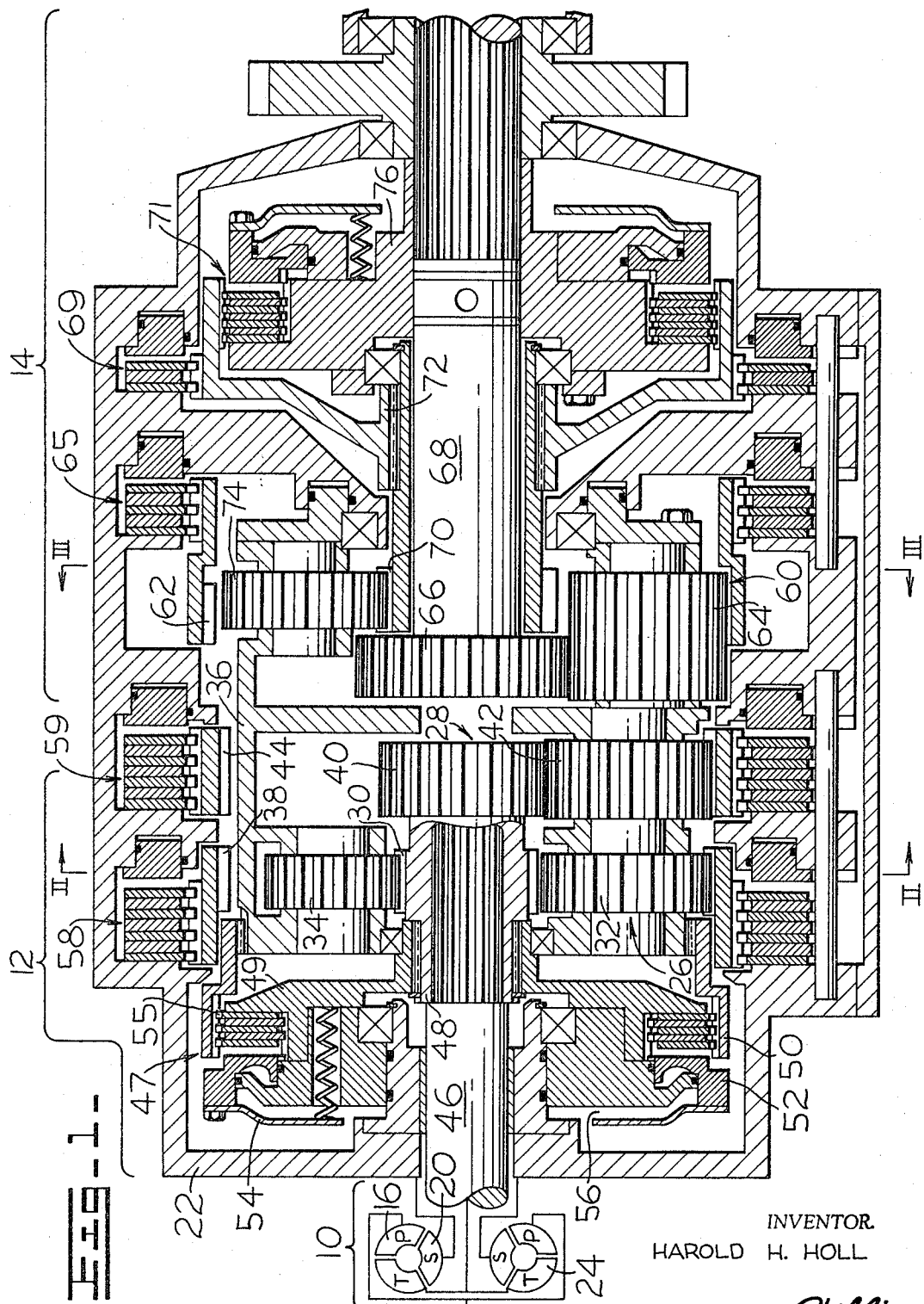

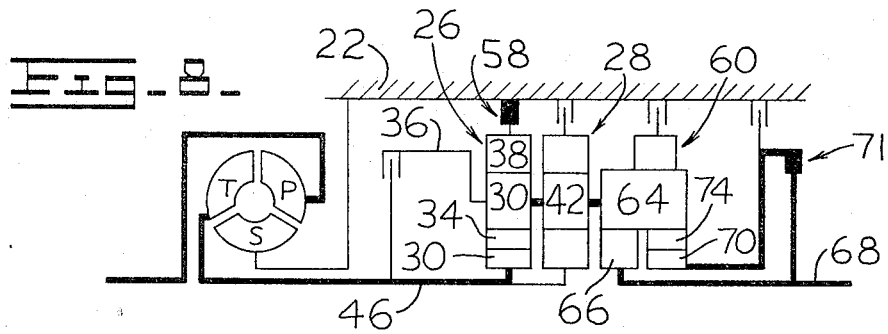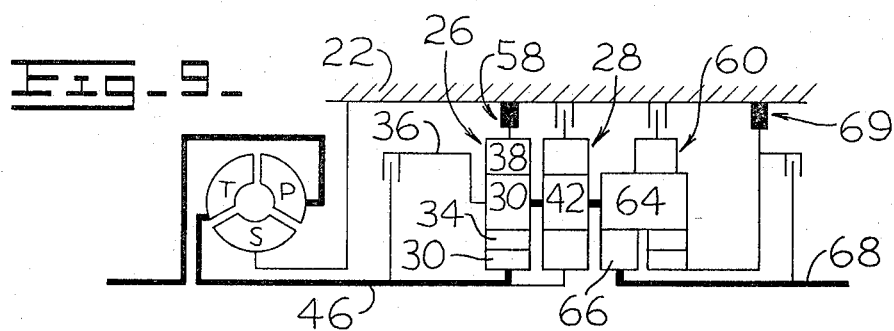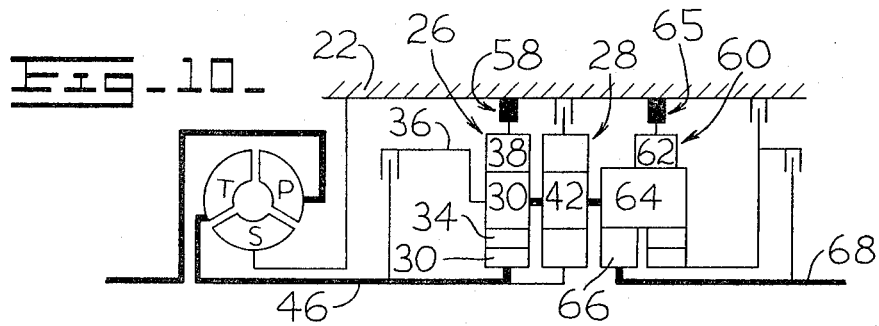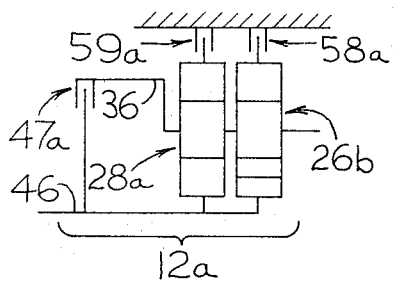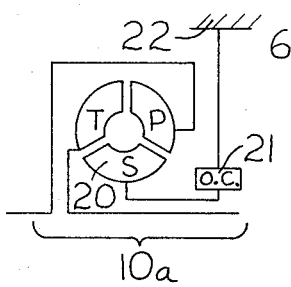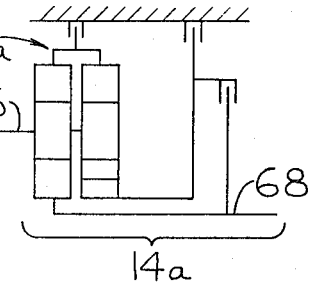

# United States Patent Office 3,381,546
Patented May 7, 1968

3,381,546
POWER TRANSMITTING MECHANISM
Harold H. Holl, Peoria, Ill., assignor to Caterpillar Tractor Co., Peoria, Ill., a corporation of California
Filed Jan. 21, 1966, Ser. No. 522,189
1 Claim. (Cl. 74—761)

ABSTRACT OF THE DISCLOSURE

A speed change transmission for selectively shifting into four forward and three reverse speed conditions which utilizes a single planet gear carrier and a novel rotating clutch arrangement to provide both a split power path mechanical drive condition and a straight mechanical drive condition.

---

The present invention relates to a vehicle power shift transmission having a variable speed drive train for selectively shifting into four forward and three reverse speed conditions.

A principal object of the invention is to provide on-the-go shifting into a variety of speed selections dependent upon the vehicle load.

Another object of the invention is to provide a drive train for a vehicle wherein the drive train has unique simplicity and dependability while having a wide range of operating conditions.

Still another object of the invention is to provide a speed transmission which transmits power at any one of four forward speed ratios and three reverse speed ratios wherein only a single planet gear carrier is employed.

Yet another object of the invention is to provide a torque converter transmisison employing but a single planet gear carrier wherein the transmission has both a dual path mechanical drive condition and a straight mechanical drive condition.

Another object of the invention is to provide a drive train for a vehicle wherein four forward speeds and three reverse speeds are selectable through a plurality of friction devices, all but two of which are brakes and two rotating clutches are so situated and of such a size as not to require elaborate disengaging means.

Still further objects of the invention include low relative speeds between the disc and plate elements in the various friction devices, adequate steps between gears, broadness of operation in each gear to reduce the need to shift constantly and a larger number of stationary braking elements over rotating clutch elements.

Further and more specific objects and advantages of the invention are made apparent in the following specification wherein a preferred embodiment of the invention is described with reference to the accompanying drawing.

In the drawing:

FIG. 1 is a semi-schematic longitudinal view, partly in section, of the power train of the present invention;

FIG. 2 is a cross-sectional view taken on the line II—II of FIG. 1;

FIG. 3 is a cross-sectional view taken on the line III—III of FIG. 1;

FIGS. 4–10 are schematic illustrations showing the flow of power through the various transmissions of the power tran if FIG. 1;

FIG. 11 is a schematic illustration of the range section of the power train wherein the planetary sets have been interchanged;

FIG. 12 is a schematic illustration wherein the torque converter has been provided with an overrunning coupling; and FIG. 13 is a schematic view illustrating a modified embodiment of the speed section of the power train.

Referring to FIGS. 1 and 4, the power train of the invention includes a front torque converter section 10, an intermediate range section 12 and a rear speed section 14 which combine to provide four speeds forward and three speeds in reverse.

The torque converter section 10 is of conventional construction embodying an input pump element 16 which is powered directly from an engine output shaft 18, a stator or reactor element 20 which is directly coupled to a transmission housing 22, and a turbine or driven element 24 which provides input to the range section 12. As noted in FIG. 12, the converter may be equipped with an overrunning coupling 21 between the housing 22 and the stator 20 to improve the efficiency of the coupling at higher speed ratios.

In general, power from the converter section 10 is transmitted to the range section 12 via a input shaft 46. The range section includes two planetary sets 26 and 28, a first rotating clutch 47, and brake elements 58 and 59 for sets 26 and 28. The carrier 36 of the range section is also the common planet carrier for the speed section 14 and furnishes the input thereto. The speed section provides a three speed multiplier for combination with the range section and includes a planetary set 60, brake elements 65 and 69, and a second rotating clutch 71 all of which are adapted to be selectively actuated for driving output shaft 68.

More specifically, as shown in FIGS. 1, 2 and 4, the range section 12 which provides two forward speeds and one reverse speed has a first planetary set 26 composed of a sun gear 30 formed on a first hub 48 which is splined to the input shaft 46, a pair of planetary gear sets 32 and 34 mounted on the carrier 36 and a ring gear 38. A second planetary set 28 comprises a sun gear 40, a planetary gear set 42 also mounted on carrier 36 and a ring gear 44. The output from torque converter 10 by way of turbine 24 is communicated by input shaft 46 to the sun gears 30 and 40 and also to the plates of clutch 47 through a second hub 49 which is splined to the first hub 48. It should be noted that it is fully within the scope of the invention to interchange the first two planetary sets as shown in FIG. 11.

Through engagement of rotating clutch 47, a high speed direct drive relationship is achieved in range section 12. In this state the disc elements of clutch 47, which are locked to common carrier 36 through a coupling member 50, are forced into communication with the plate elements 55 by rightward movement of an annular, hydraulically operated piston 52. This action effectively connects carrier 36 with shaft 46 and its associated sun gears 30 and 40, thus locking up the range section 12 into a single rotating assembly. A piston 54 is used to balance the centrifugal head of any oil trapped in the chamber behind piston 52 to insure proper disengagement of clutch 47. More particularly, oil is directed from a suitable jet (not shown) to a chamber 56 formed by piston 54 to achieve a rotating head of fluid which urges the piston 52 leftwardly in opposition to any fluid trapped behind it. This balancing piston arrangement is not the subject of the instant invention and is fully disclosed in U.S. 3,217,851 to Mogk, Nordling, Ramsel and Rohweder.

The engagement of brake 58 allows reverse to be achieved in the range section by communicating power via sun gear 30, planets 34 and 32 to the output carrier 36 by virtue of braking ring gear 38. A speed reduction of 3.00 is provided in this range.

The engagement of brake 59 provides a low speed condition with a reduction of 3.857 through the range section. In this speed, power input via shaft 46 is directed to output carrier 36 by the elements of the second planetary set 28 due to holding ring gear 44 stationary with respect to housing 22.

Referring now to FIGS. 1, 3 and 4, it is noted that the carrier 36 of the range section is also the common planet carrier for the speed section 14 and furnishes the input to it. The speed section 14 provides a three speed multiplier which could be used in combination with the elements of the range unit to provide a total of six forward speeds. Although combinations 47–65 and 47–71 are not utilized herein, it is to be recognized that they might be utilized in other applications.

Engagement of brake elements 65 and 69, and rotating clutch 71 in combination with a planetary set 60 (which is the functional equivalent of two separate epicyclic trains) allows respective reductions of .301, .561 and 1.00 to be achieved.

With brake 65 engaged, a speed condition is provided wherein a ring gear 62 is held stationary and rotating carrier 36 causes a set of long planet gears 64 to revolve, in turn causing a sun gear 66 to be driven which sun gear is integral with the output shaft 68.

In effect, engagement of brake 69 provides a greater speed reduction than that obtainable through brake 65 by causing long planets 64 to rotate more slowly for a given carrier input speed. This is accomplished by holding a sun gear 70 stationary with respect to housing 22 through an intermediate first hub 72 and attached discs of brake 69. Short planets 74 are utilized between sun gear 70 and long planets 64 to complete this long-and-short planet system which is sometimes referred to as a Ravigneaux gear train. This combination allows economy of construction by eliminating a ring gear and three planet gears as may be seen by comparing the schematic illustration at 60 in FIG. 4 with the equivalent epicyclic train shown at 60a in FIG. 13.

Engagement of rotating clutch 71 locks hub 72 to a second hub 76 which is splined to the output shaft 68. With clutch 71 engaged a split power path is formed in speed train 14 and, as shown for example in FIG. 4, 56 percent of the torque is transmitted through sun gear 66 and 44 percent through planets 74, sun gear 70, hub 72, clutch 71 and hub 76. The split power paths associated with engagement of clutch 71 simplifies the design of the speed section 14. Since each path carries a proportional part of the total torque load individual components, such as shaft 68, etc., can be made smaller and/or less strong.

In FIGS. 4–10, the power flow paths and the engaged control clutches and/or brakes are illustrated in darkened lines. FIGS. 4–7 illustrate first through fourth gears forward, respectively, while FIGS. 8–10 show first through third gears reverse, respectively.

I claim:

1. A speed change transmission for selectively shifting into four forward and three reverse speed conditions, comprising: an input shaft; an output shaft; first, second and third axially spaced planetary sets; a common planet carrier spanning the shafts and carrying said planetary sets; said first and second planetary sets being operatively associated with said input shaft to provide a range section for said transmission and said third planetary set comprising a Ravigneaux gear train operatively associated with said output shaft to provide a speed section for said transmission; a first rotating clutch connected between said planet carrier and said input shaft for locking said planet carrier for rotation with said input shaft when said clutch is engaged; a second rotating clutch for providing a split power path through said third planetary set to said output shaft when said second rotating clutch is engaged; a first sun gear on said input shaft; said first planet set having a first drive planet on said carrier engaging said first sun gear, a second drive planet on said carrier engaging said first drive planet, a first rotatable ring gear surrounding said second drive planet and in engagement therewith, and means for selectively preventing rotation of said first ring gear; a second sun gear on said input shaft; said second planet set having a third drive planet on said carrier engaging said second sun gear, a second rotatable ring gear surrounding said third drive planet and in engagement therewith, and means for selectively preventing rotation of said second ring gear; said third planet set having associated therewith a first output sun gear on said output shaft, a first output planet on said carrier and engaging said first output sun gear, a first rotatable output ring gear surrounding said first output planet and in engagement therewith, means for selectively preventing rotation of said first output ring gear, a second output sun gear fixed to a rotatable sleeve member surrounding said output shaft, a second output planet on said carrier engaging said second output sun gear and said first output planet, a first rotatable hub fixed to said rotatable sleeve, means for selectively preventing rotation of said hub, a second rotatable hub fixed on said output shaft, and said second rotatable clutch means located between said first and second hubs and selectively operable to connect said hubs for rotation.

References Cited

UNITED STATES PATENTS

| | | | |
|---|---|---|---|
| 760,160 | 5/1904 | Smith et al. | 74—769 |
| 2,194,954 | 3/1940 | Ravigneaux | 74—761 |
| 2,195,783 | 4/1940 | Ravigneaux | 74—761 |
| 2,751,799 | 6/1956 | Long | 74—769 |
| 2,890,603 | 6/1959 | Harris et al. | 74—769 X |
| 3,137,182 | 6/1964 | Berchtold et al. | 74—769 X |
| 3,209,617 | 10/1965 | Kalversberg | 74—688 |
| 3,234,821 | 2/1966 | Himmel et al. | 74—761 X |
| 3,298,252 | 1/1967 | Harris et al. | 74—761 |

FRED C. MATTERN, Jr., *Primary Examiner.*

THOMAS C. PERRY, *Examiner.*